United States Patent
Kanode et al.

(10) Patent No.: US 8,792,329 B2
(45) Date of Patent: Jul. 29, 2014

(54) METHODS, SYSTEMS, AND COMPUTER READABLE MEDIA FOR PERFORMING DIAMETER ANSWER MESSAGE-BASED NETWORK MANAGEMENT AT A DIAMETER SIGNALING ROUTER (DSR)

(75) Inventors: Mark Edward Kanode, Apex, NC (US); Thomas M. McCann, Raleigh, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 455 days.

(21) Appl. No.: 13/026,125

(22) Filed: Feb. 11, 2011

(65) Prior Publication Data

US 2011/0199906 A1 Aug. 18, 2011

Related U.S. Application Data (60) Provisional application No. 61/304,310, filed on Feb. 12, 2010.

(51) Int. Cl.
| | | |
|---|---|---|
| *H04L 1/00* | (2006.01) | |
| *G06F 11/00* | (2006.01) | |
| *G06F 15/16* | (2006.01) | |

(52) U.S. Cl.
USPC ........... 370/216; 370/236; 370/237; 370/242; 709/235

(58) Field of Classification Search
USPC ......... 370/216–228, 229–238, 241–252, 315, 370/324, 400–401, 449–462, 496, 370/503–529; 709/223–226, 230–235
See application file for complete search history.

(56) References Cited

U.S. PATENT DOCUMENTS

| | | | |
|---|---|---|---|
| 5,228,083 | A | 7/1993 | Lozowick et al. |
| 5,719,861 | A | 2/1998 | Okanoue |
| 6,157,621 | A | 12/2000 | Brown et al. |
| 6,273,622 | B1 | 8/2001 | Ben-David |
| 6,304,273 | B1 | 10/2001 | Bonnet |
| 6,584,073 | B1 | 6/2003 | Steele, Jr. et al. |
| 6,795,546 | B2 | 9/2004 | Delaney et al. |
| 6,819,652 | B1 | 11/2004 | Akhtar et al. |

(Continued)

FOREIGN PATENT DOCUMENTS

| | | |
|---|---|---|
| CA | 2 716 544 A1 | 12/2010 |
| EP | 1 134 939 A1 | 9/2001 |

(Continued)

OTHER PUBLICATIONS

Notice of Allowance and Fee(s) Due for U.S. Appl. No. 13/026,162 (Dec. 19, 2012).

(Continued)

*Primary Examiner* — Tri H Phan
(74) *Attorney, Agent, or Firm* — Jenkins, Wilson, Taylor & Hunt, P.A.

(57) ABSTRACT

Methods, systems, and computer readable media for performing Diameter answer message-based network management at a Diameter signaling router (DSR) are disclosed. According to one method, a Diameter answer message that includes error indicator information is received from a first Diameter node at a DSR. The error indicator information included in the Diameter answer message is examined, at the DSR, and information based on the error indicator information is used to update status information for routes maintained by the DSR to the first Diameter node.

21 Claims, 9 Drawing Sheets

(56) References Cited

U.S. PATENT DOCUMENTS

| | | |
|---|---|---|
| 6,865,153 B1 | 3/2005 | Hill et al. |
| 6,915,345 B1 | 7/2005 | Tummala et al. |
| 6,918,041 B1 | 7/2005 | Chen |
| 6,954,790 B2 | 10/2005 | Forslöw |
| 6,967,956 B1 | 11/2005 | Tinsley et al. |
| 7,042,877 B2 | 5/2006 | Foster et al. |
| 7,043,000 B2 | 5/2006 | Delaney et al. |
| 7,079,499 B1 | 7/2006 | Akhtar et al. |
| 7,136,635 B1 | 11/2006 | Bharatia et al. |
| 7,257,636 B2 | 8/2007 | Lee et al. |
| 7,286,516 B2 | 10/2007 | Delaney et al. |
| 7,292,592 B2 | 11/2007 | Rune |
| 7,298,725 B2 | 11/2007 | Rune |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 | 7/2008 | Zeng et al. |
| 7,403,537 B2 | 7/2008 | Allison et al. |
| 7,466,807 B2 | 12/2008 | McCann et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 | 9/2009 | Rune |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,792,981 B2 | 9/2010 | Taylor |
| 7,822,023 B2 | 10/2010 | Lahetkangas et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,170,035 B2 | 5/2012 | Furey et al. |
| 8,170,055 B2 | 5/2012 | Fang et al. |
| 8,223,658 B2 * | 7/2012 | Bahr ........................... 370/242 |
| 8,359,015 B2 * | 1/2013 | Swaminathan et al. ... 455/414.1 |
| 8,478,828 B2 | 7/2013 | Craig et al. |
| 8,483,233 B2 | 7/2013 | Craig et al. |
| 8,498,202 B2 * | 7/2013 | Kanode et al. ................ 370/225 |
| 8,504,630 B2 | 8/2013 | Craig et al. |
| 8,527,598 B2 | 9/2013 | Craig et al. |
| 8,532,110 B2 | 9/2013 | McCann et al. |
| 8,547,908 B2 | 10/2013 | Marsico |
| 8,554,928 B2 | 10/2013 | Craig et al. |
| 8,578,050 B2 | 11/2013 | Craig et al. |
| 8,601,073 B2 | 12/2013 | Craig et al. |
| 2001/0024443 A1 | 9/2001 | Alriksson et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |
| 2002/0181507 A1 | 12/2002 | Jones |
| 2003/0095536 A1 | 5/2003 | Hu et al. |
| 2003/0115358 A1 | 6/2003 | Yun |
| 2003/0225938 A1 | 12/2003 | Glasco et al. |
| 2004/0037278 A1 | 2/2004 | Wong et al. |
| 2004/0042485 A1 | 3/2004 | Gettala et al. |
| 2004/0098612 A1 | 5/2004 | Lee et al. |
| 2005/0002417 A1 | 1/2005 | Kelly et al. |
| 2005/0099964 A1 | 5/2005 | Delaney et al. |
| 2005/0232236 A1 | 10/2005 | Allison et al. |
| 2005/0232407 A1 | 10/2005 | Craig et al. |
| 2005/0235065 A1 | 10/2005 | Le et al. |
| 2005/0246545 A1 | 11/2005 | Reiner |
| 2005/0246716 A1 | 11/2005 | Smith et al. |
| 2006/0045249 A1 | 3/2006 | Li et al. |
| 2006/0077926 A1 | 4/2006 | Rune |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0253563 A1 | 11/2006 | Yang et al. |
| 2006/0274744 A1 | 12/2006 | Nagai et al. |
| 2007/0047539 A1 | 3/2007 | Agarwal et al. |
| 2007/0076600 A1 | 4/2007 | Ekl et al. |
| 2007/0153995 A1 | 7/2007 | Fang et al. |
| 2007/0168421 A1 | 7/2007 | Kalyanpur et al. |
| 2007/0214209 A1 * | 9/2007 | Maeda ........................ 709/202 |
| 2007/0280447 A1 | 12/2007 | Cai et al. |
| 2007/0297419 A1 | 12/2007 | Asherup et al. |
| 2008/0025230 A1 | 1/2008 | Patel et al. |
| 2008/0039104 A1 | 2/2008 | Gu et al. |
| 2008/0043614 A1 | 2/2008 | Soliman |
| 2008/0144602 A1 | 6/2008 | Casey |
| 2008/0167035 A1 | 7/2008 | Buckley et al. |
| 2008/0212576 A1 | 9/2008 | O'Neill |
| 2008/0301162 A1 | 12/2008 | Wall et al. |
| 2008/0317247 A1 | 12/2008 | Jeong et al. |
| 2009/0080440 A1 | 3/2009 | Balyan et al. |
| 2009/0083861 A1 | 3/2009 | Jones |
| 2009/0129271 A1 | 5/2009 | Ramankutty et al. |
| 2009/0138619 A1 | 5/2009 | Schnizlein et al. |
| 2009/0185494 A1 * | 7/2009 | Li et al. ..................... 370/241 |
| 2009/0193071 A1 | 7/2009 | Qiu et al. |
| 2009/0232011 A1 | 9/2009 | Li et al. |
| 2009/0319686 A1 | 12/2009 | Watanabe |
| 2010/0017846 A1 | 1/2010 | Huang et al. |
| 2010/0042525 A1 | 2/2010 | Cai et al. |
| 2010/0135287 A1 | 6/2010 | Hosain et al. |
| 2010/0251330 A1 | 9/2010 | Kroeselberg et al. |
| 2010/0265948 A1 | 10/2010 | Patel et al. |
| 2010/0299451 A1 * | 11/2010 | Yigang et al. .................. 709/241 |
| 2011/0060830 A1 | 3/2011 | Kang et al. |
| 2011/0116378 A1 | 5/2011 | Ramankutty et al. |
| 2011/0116382 A1 | 5/2011 | McCann et al. |
| 2011/0188397 A1 | 8/2011 | McCann et al. |
| 2011/0199895 A1 | 8/2011 | Kanode et al. |
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 * | 8/2011 | Craig et al. ................... 709/206 |
| 2011/0202614 A1 | 8/2011 | Craig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0225280 A1 | 9/2011 | Delsesto et al. |
| 2011/0225281 A1 | 9/2011 | Riley et al. |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0155389 A1 | 6/2012 | McNamee et al. |
| 2012/0224524 A1 | 9/2012 | Marsico |
| 2013/0346549 A1 | 12/2013 | Craig et al. |

FOREIGN PATENT DOCUMENTS

| | | |
|---|---|---|
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| WO | WO 2008/087633 A2 | 7/2008 |
| WO | WO 2009/058067 A1 | 5/2009 |
| WO | WO 2009/070179 A1 | 6/2009 |
| WO | WO 2009/128837 A1 | 10/2009 |
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |

(56) References Cited

FOREIGN PATENT DOCUMENTS

| WO | WO 2011/100612 A2 | 8/2011 |
|---|---|---|
| WO | WO 2011/100621 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2012/119147 A1 | 9/2012 |

OTHER PUBLICATIONS

Final Official Action for U.S. Appl. No. 13/026,076 (Dec. 7, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Final Official Action for U.S. Appl. No. 12/906,816 (Feb. 21, 2012).
Applicant-Initiated Interview Summary for U.S. Appl. No. 12/906,816 (Jan. 27, 2012).
Notification of Transmittal of the International Search Report and the Written Opinion of the International Searching Authority, or the Declaration for International Application No. PCT/US2011/024622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Notification of Transmittal of the International Search Report and the Written Opinion of the International Searching Authority, or the Declaration for International Application No. PCT/US2010/053062 (Jun. 28, 2011).
Znaty, "Diameter, GPRS, (LTE + ePC = EPS), IMS, PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function(IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).

(56) References Cited

OTHER PUBLICATIONS

3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).

3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).

3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).

3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).

3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).

3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).

3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).

3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).

3GPP, "3rd Generation Partnership Project; Technical Specification Group Services and System Aspects; Policy and Charging Control Architecture (Release 9)," 3GPP TS 23.203 V9.3.0 (Dec. 2009).

Jiao et al., "The Diameter Capabilities Update Application," Network Working Group Internet-Draft draft-ietf-dime-capabilities-update-01, pp. 1-8 (Dec. 1, 2009).

Tsou et al., "Realm-Based Redirection in Diameter," Internet Engineering Task Force, draft-ietf-dime-realm-based-redirect-02, pp. 1-7 (Oct. 27, 2009).

Huang et al., "The Diameter Precongestion Notification (PCN) Data Collection Applications," Network Working Group Internet-Draft <draft-huang-dime-pcn-collection-02>, pp. 1-19 (Oct. 26, 2009).

Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).

Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).

Fajardo et al., "Diameter Base Protocol," DIME Internet-Draft, draft-ietf-dime-rfc3588bis-19.txt, pp. 1-160 (Sep. 2, 2009).

3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).

3GPP, "3rd Generation Partnership Project; Technical Specification Group Core Network and Terminals; Numbering, Addressing and Identification (Release 8)," 3GPP TS 23.003 V8.6.0 (Sep. 2009).

Jones et al., "Diameter Extended NAPTR," Internet-Draft, draft-jones-dime-extended-naptr-00, pp. 1-8 (Aug. 23, 2009).

Korhonen et al., "Diameter User-Name and Realm Based Request Routing Clarifications," Internet-Draft, draft-ietf-dime-nai-routing-03.txt, pp. 1-11 (Aug. 19, 2009).

Tsou et al., "Session-Spectific Explicit Diameter Request Routing," Network Working Group Internet-Draft, draft-tsou-diameter-explicit-routing-03, pp. 1-18 (Aug. 5, 2009).

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

Bhardwaj, "Roaming Hubbing & LTE," GSMA London, pp. 1-11 (May 19, 2009).

3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).

3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Aboba et al., "The Network Access Identifier," Network Working Group, RFC 4282, pp. 1-17 (Dec. 2005).

3GPP, "3rd Generation Partnership Project; Technical Specification Group Core Network and Terminals; Policy Control Over Go Interface (Release 6)," 3GPP TS 29.207 V6.5.0 (Sep. 2005).

Eronen et al., "Diameter Extensible Authentication Protocol (EAP) Application," Network Working Group, RFC 4072, pp. 1-31 (Aug. 2005).

Hakala et al., "Diameter Credit-Control Application," Network Working Group RFC 4006, pp. 1-107 (Aug. 2005).

Calhoun et al., "Diameter Mobile IPv4 Application," Network Working Group, RFC 4004, pp. 1-50 (Aug. 2005).

3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

Calhoun et al., "Diameter Base Protocol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).

Stewart et al., "Stream Control Transmission Protocol," Network Working Group RFC 2960, pp. 1-134 (Oct. 2000).

Greene et al., "Bi-Directional Session Setup Extension to Diameter," Internet Draft <draft-greene-diameter-ss7-session-00.txt>, pbs. 1-12 (Jul. 1998).

"Diameter Overview," referenced from www.ulticom.com/html/products/signalware-diameter-reference-guide.asp (Publication Date Unknown).

Final Official Action for U.S. Appl. No. 13/026,105 (Nov. 26, 2012).

Non-Final Official Action for U.S. Appl. No. 13/026,153 (Nov. 6, 2012).

Non-Final Official Action for U.S. Appl. No. 13/412,352 (Oct. 26, 2012).

Non-Final Official Action for U.S. Appl. No. 13/026,144 (Oct. 16, 2012).

Non-Final Official Action for U.S. Appl. No. 13/026,098 (Sep. 20, 2012).

Non-Final Official Action for U.S. Appl. No. 13/026,060 (Sep. 19, 2012).

Communication of European Publication Number and Information on the Application of Article 67(3) EPC for European Patent Application No. 11742921.7 (Sep. 12, 2012).

Non-Final Official Action for U.S. Appl. No. 13/026,081 (Sep. 12, 2012).

(56) References Cited

OTHER PUBLICATIONS

Non-Final Official Action for U.S. Appl. No. 13/026,112 (Aug. 29, 2012).

Communication of European publication Number and information on the application of Article 67(3) EPC for European Application No. 10824243.9 (Jul. 25, 2012).

Notification of Transmittal of the International Search Report and the Written Opinion of the International Searching Authority, or the Declaration for International Patent Application No. PCT/US2012/027736 (Jun. 12, 2012).

Traffix Systems, "Datasheet; Traffix Signaling Delivery Controller (SDC)," pp. 1-5 (May 2011).

Commony-Assigned, Co-Pending Continuation U.S. Appl. No. 13/932,608 titled "Methods, Systems, and Computer Readable Media for Inter-Diameter-Message Processor Routing," (unpublished, filed Jul. 1, 2013).

Notice of Allowance and Fee(s) Due for for U.S. Appl No. 13/026,076 (Jun. 27, 2013).

Notice of Allowance and Fee(s) Due for U.S. Appl. No. 13/026,081 (Jun. 5, 2013).

Notice of Allowance and Fee(s) Due for U.S. Appl. No. 13/026,031 (May 30, 2013).

Notice of Allowance and Fee(s) Due for U.S. Appl. No. 13/412,352 (May 28, 2013).

Interview Summary for U.S. Appl. No. 13/026,098 (May 23, 2013).

Final Office Action for U.S. Appl. No. 13/026,060 (May 10, 2013).

Notice of Allowance and Fee(s) Due for U.S. Appl. No. 13/026,144 (May 1, 2013).

Notice of Allowance and Fee(s) Due for U.S. Appl. No. 13/026,112 (Apr. 26, 2013).

Notice of Allowance and Fee(s) Due for U.S. Appl. No. 13/026,153 (Apr. 15, 2013).

Notice of Allowance and Fee(s) Due for U.S. Appl. No. 13/026,162 (Apr. 1, 2013).

Supplemental Notice of Allowability for U.S. Appl. No. 13/026,031 (Mar. 22, 2013).

Notice of Allowance and Fee(s) Due for U.S. Appl. No. 13/026,098 (Mar. 11, 2013).

Interview Summary for U.S. Appl. No. 13/026,144 (Mar. 4, 2013).

Supplemental Notice of Allowability for U.S. Appl. No. 13/026,162 (Feb. 27, 2013).

Notice of Allowance and Fee(s) Due for U.S. Appl. No. 13/025,968 (Feb. 27, 2013).

Supplemental Notice of Allowability for U.S. Appl. No. 13/026,162 (Feb. 7, 2013).

Notice of Allowance and Fee(s) Due for U.S. Appl. No. 13/026,031 (Jan. 30, 2013).

Supplemental Notice of Allowability for U.S. Appl. No. 13/026,162 (Jan. 24, 2013).

Non-Final Office Action for U.S. Appl. No. 12/906,816 (Oct. 1, 2013).

Notice of Allowance and Fee(s) Due for U.S. Appl. No. 13/026,060 (Sep. 25, 2013).

Commony-Assigned, Co-Pending Continuation U.S. Appl. No. 14/016,000 titled "Methods, Systems, and Computer Readable Media for Answer-Based Routing of Diameter Request Messages," (Unpublished, filed Aug. 30, 2013).

Non-Final Office Action for U.S. Appl. No. 13/026,133 (Aug. 19, 2013).

Applicant-Initiated Interview Summary for U.S. Appl. No. 12/906,816 (Jan. 10, 2014).

Extended European Search Report for European Application No. 11742905.0 (Dec. 11, 2013).

Extended European Search Report for European Application No. 11742894.6 (Dec. 3, 2013).

Tsou et al., "Diameter Routing Extensions," draft-tsou-dime-base-routing-ext-04, Internet-Draft, pp. 1-28 (Jul. 29, 2008).

Ravikumar et al., "Star-Graph Based Multistage Interconnection Network for ATM Switch Fabric," Parallel and Distributed Processing, pp. 1-8 (Oct. 26, 1994).

* cited by examiner

METHODS, SYSTEMS, AND COMPUTER READABLE MEDIA FOR PERFORMING DIAMETER ANSWER MESSAGE-BASED NETWORK MANAGEMENT AT A DIAMETER SIGNALING ROUTER (DSR)

PRIORITY CLAIM

This application claims the benefit of U.S. Provisional Patent Application Ser. No. 61/304,310 filed Feb. 12, 2010; the disclosure of which is incorporated herein by reference in its entirety.

STATEMENT OF INCORPORATION BY REFERENCE

The disclosures of each of the following commonly-owned, co-pending U.S. patent applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to processing of Diameter answer messages. More specifically, the subject matter relates to methods, systems, and computer readable media for performing Diameter answer message-based network management at a Diameter message routing agent, such as a Diameter signaling router (DSR) node.

BACKGROUND

Diameter is an authentication, authorization and accounting (AAA) protocol for computer networks, and is a successor to RADIUS. The Diameter base protocol is defined in IETF RFC 3588, the disclosure of which is incorporated herein by reference herein in its entirety. Diameter communications may use a request-answer message exchange. Conventional Diameter answer message processing, including conventional relaying and proxying of answer messages, may be performed by a Diameter message routing agent. The base Diameter specification requires that answer message responses be routed over the same network path as the corresponding request message was forwarded. When a Diameter agent receives an answer message, it must route the message to the peer from which it received the corresponding request message. In order to ensure that each answer message is returned along the same path as its corresponding request message, the Diameter routing agent may maintain routing state information for each pending Diameter transaction (i.e., a Diameter request awaiting an answer).

As such, a Diameter routing agent is typically deployed in such a manner so as to permit the Diameter routing agent to see both the request and answer message portions of a Diameter transaction. However, the processing of answer messages is limited to their specific transactions, even though the answer messages may contain information that is usable for network management purposes. Accordingly, in light of these difficulties, a need exists for improved methods, systems, and computer readable media for improved network management in Diameter networks.

SUMMARY

Methods, systems, and computer readable media for performing Diameter answer message-based network management at a DSR are disclosed. According to one method, a Diameter answer message that includes error indicator information is received from a first Diameter node at a DSR. The error indicator information included in the Diameter answer message is examined, at the DSR, and the error indicator information is used to update status information for routes maintained by the DSR to the first Diameter node.

A system for performing Diameter answer message-based network management is also disclosed. The system includes a Diameter signaling router (DSR). The DSR includes a Diameter message processor for receiving a Diameter answer message that includes error indicator information from a first Diameter node. A network management (NM) module examines the error indicator information contained in the Diameter answer message and uses the error indicator information to update status information for routes maintained by the DSR to the first Diameter node.

According to another aspect, a method for providing network management is disclosed. The method includes establishing a lost answer message timer signifying a time period, after which, if an answer message responsive to a Diameter request message has not been received, it is determined that the answer message is lost. In response to determining that an answer message is lost, network management information maintained at the DSR may be updated and potentially distributed to other interested Diameter peer nodes. Additionally, resources may be deallocated by the DSR, which may include removing one or more pending transaction records maintained by the DSR.

According to another aspect, a system for unsolicited network management communication is disclosed. The system includes a DSR. The DSR includes a network management module for establishing a lost answer message timer signifying a time period, after which, if an answer message responsive to a Diameter request has not been received, it is determined that the answer message is lost and for updating Diameter network management information associated with a Diameter request message in response to determining that no Diameter answer message related to a Diameter request message was detected prior to expiration of the lost answer message timer. The system further includes a Diameter message processor for communicating Diameter network management information associated with a Diameter request message to one or more Diameter nodes in the network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

As mentioned above, a Diameter routing agent is typically deployed in such a manner so as to permit the Diameter routing agent to see both the request and answer message portions of a Diameter transaction. Accordingly, the subject matter described herein includes methods, systems, and computer readable media for exploiting this particular characteristic of Diameter message routing/propagation through a Diameter network in order to obtain and share Diameter network status/network management information among interested Diameter entities in the network.

Figure 1A:
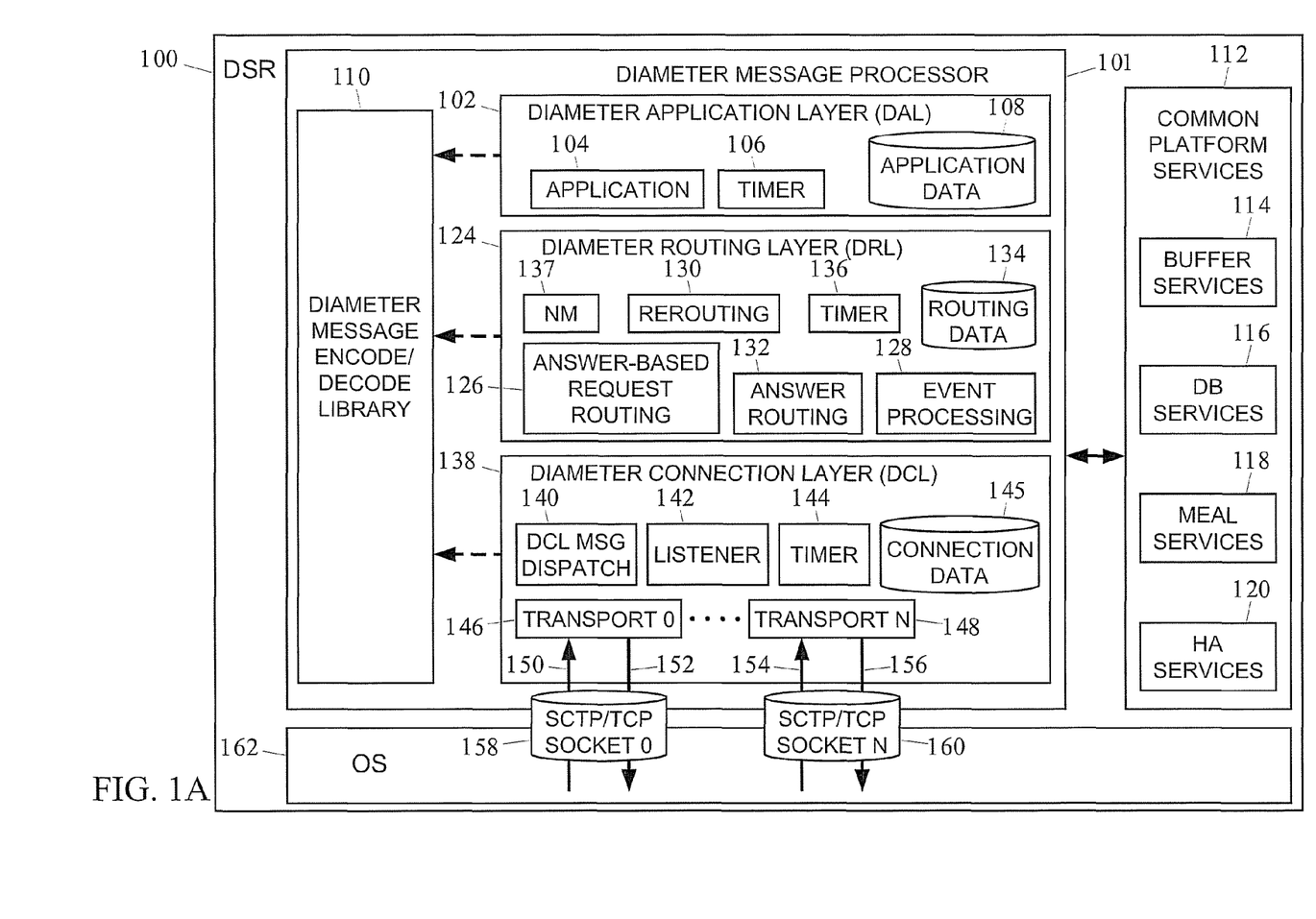
FIG. 1A is a block diagram of an exemplary Diameter signaling router for performing Diameter answer message-based network management according to an embodiment of the subject matter described herein.

FIG. 1A is a block diagram of an exemplary Diameter relay/signaling routing node for performing Diameter answer message-based network management according to embodiments of the subject matter described herein. Referring to FIG. 1A, Diameter signaling router (DSR) 100 may include a Diameter connection layer (DCL), Diameter routing layer (DRL), one or more applications, and one or more routing tables. DSR 100 may perform a variety of Diameter message routing functions and, therefore, may include functionality of a Diameter routing agent, Diameter relay agent, Diameter redirect agent, Diameter proxy agent, and/or Diameter translation agent. Exemplary DRL capabilities may include: routing request messages to peers or local applications based on message content, discarding or rejecting Diameter request messages based on message content rules, peer congestion control, allowing an operator to access only the features and capacities that are purchased, and easier configuration. In addition to message routing, DSR 100 may support a variety of value-add services/applications. In order to support both application processing and core Diameter routing functions, DSR 100 may support two message routing tables: an application routing table (ART) and a peer routing table (PRT). Additionally, the subject matter described herein for performing Diameter answer message-based network management may be designed with the assumption that answer messages and/or request messages will be lost and, therefore, effectively handle lost answer messages in order to avoid wasting memory or other resources to maintain pending transaction records for transactions that are no longer pending.

Diameter message processor 101 may be a printed circuit board including the processor and associated memory for performing Diameter routing and answer based message processing as described herein. As such, Diameter message processor 101 may support a variety of layers and applications by performing these functions. One layer on Diameter message processor 101 is Diameter application layer (DAL) 102.

DAL 102 may include applications 104. Exemplary applications 104 may include, but are not limited to, a Diameter client, Diameter server, translation agent, proxy agent, redirect agent, and a load generator. DAL 102 may also include timer 106 and application data 108. DAL 102 may interface with Diameter message encode/decode library 110 for encoding and decoding Diameter messages.

Common platform services 112 may include buffer services 114, database services 116, measurements events alarms and logs (MEAL) services 118, and high availability (HA) services 120.

Diameter message processor 101 may further include Diameter routing layer (DRL) 124. DRL 124 may be responsible for the following functions. DRL 124 may perform ingress and egress message looping detection and prevention.

DRL 124 may route ingress message to one or more local DSR applications based upon user-define rules. DRL 124 may reroute messages upon failures. DRL 124 may perform message routing based upon route priorities and weights. DRL 124 may perform message routing based upon user-defined message content. DRL 124 may perform message routing to peers with multiple transport connections. DRL 124 may manage peer transport connections (TPS). DRL 124 may throttle ingress messages based upon local DSR congestion. DRL 124 may detect and avoid peer congestion. DRL 124 may load balance peer connection load to meet MP TPS constraints.

DRL 124 may include answer-based request routing module 126, event processing module 128, DRL rerouting module 130, answer routing module 132, routing data 134, and DRL timer task 136. Answer-based request routing module 126 may route request messages based on information determined from previously received answer messages. The functionality of routing answer messages based on request messages is described in detail in the above-described commonly-assigned patent application entitled, "Methods, Systems, and Computer Readable Media for Answer-Based Routing of Diameter Request Messages." Message processor 101 may further include Diameter network management module 137 for updating route data 134 based on information learned from answer messages. The functionality of network management module 137 will be described in further detail below.

DRL 124 may communicate with DAL 102 via message-based APIs. For example, DRL 124 may use application indication and application request APIs to communicate with DAL 102.

Diameter connection layer (DCL) 138 may perform the following functions. DCL 138 may implement Diameter connection state machine 140 for each Diameter peer. DCL 138 may establish transport connections with Diameter peers and process Diameter peer-to-peer messages and related functionality. This may include capabilities exchange request/answer (CER/CEA), Diameter Watchdog request/answer (DWR/DWA), and Disconnect Peer request/answer (DPR/DPA). DCL 138 may interface with the DRL 124 by sending Diameter messages received from peers to DRL 124 using one or more message-based APIs. DCL 138 may send Diameter messages received from DRL 124 to the appropriate peer. DCL 138 may notify DRL of peer transport connection and congestion status changes. DCL 138 may process configuration and maintenance requests from DSR OAM for transport configuration objects. DCL 138 may update MEAL data for transport configuration objects. DCL 138 may perform transport layer capacity control.

DCL 138 may include Diameter message dispatch module 140, DCL listener module 142, DCL timer task 144, and connection data 145.

DCL 138 may also include one or more IP transport tasks. For example, DCL 138 may include IP transport task 146 and 148, where each IP transport task includes a receiving thread and a transmitting thread. For example, IP transport task 146 includes Rx thread 150 and Tx thread 152 and IP transport task 148 includes Rx thread 154 and Tx thread 156. IP transport tasks 146 and 148 may each communicate with SCTP/TCP sockets for interfacing with an operating system. For example, IP transport task 146 may communicate with SCTP/TCP socket 158 and IP transport task 148 may communicate with SCTP/TCP socket 160. SCTP/TCP sockets 158 and 160 may be associated with OS 162.

Figure 1B:
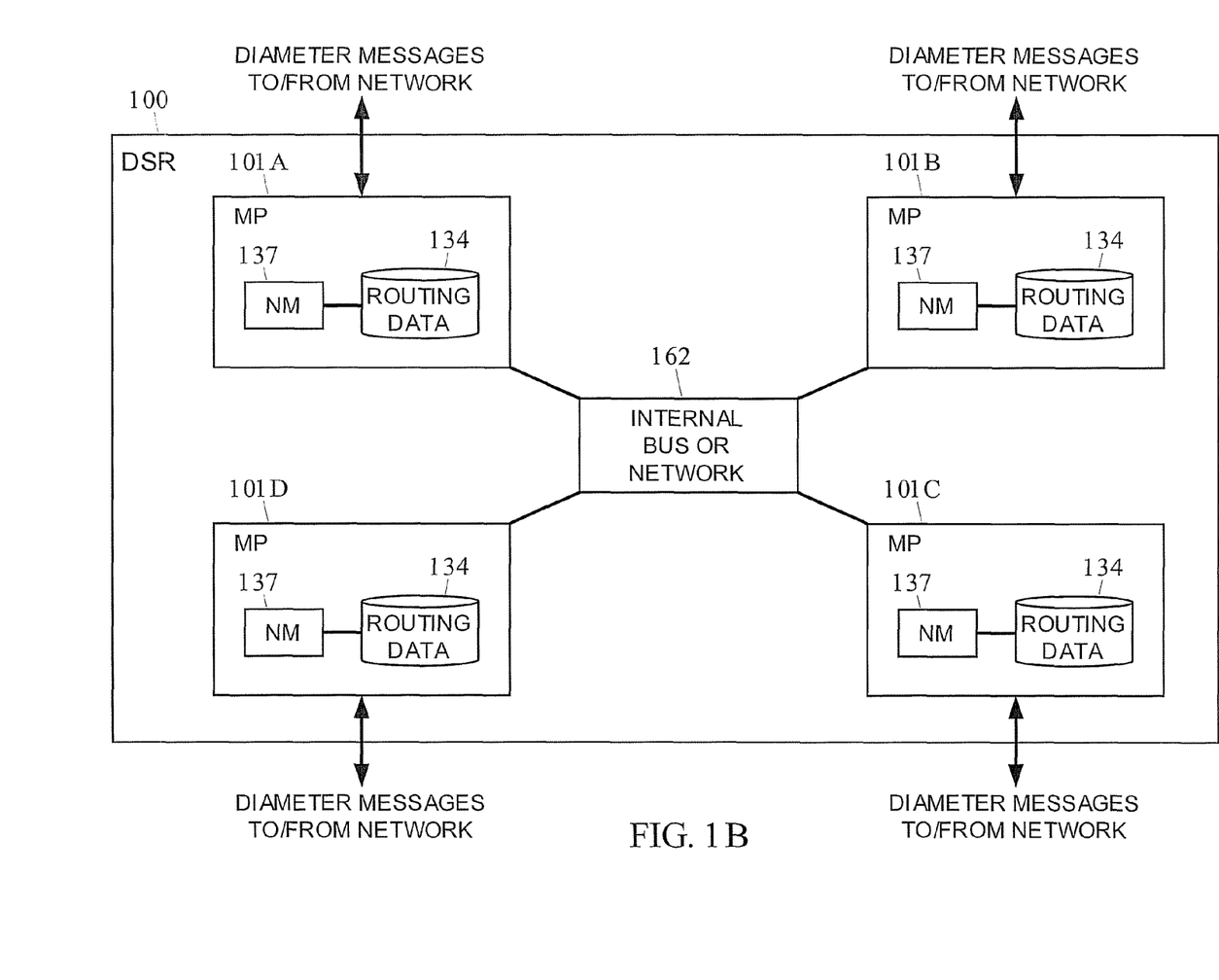
FIG. 1B is a block diagram of a Diameter signaling router having a distributed internal architecture according to an embodiment of the subject matter described herein.

For simplicity, DSR 100 illustrated in FIG. 1A includes a single message processor 101. This is one possible configuration of DSR 100, where a single message processor routes all Diameter signaling messages. However, DSR 100 may include full message processors, each configured as message processor 101 illustrated in FIG. 1A. FIG. 1B illustrates such an embodiment. In FIG. 1B, DSR 100 includes a plurality of message processors 101A-D, each of which sends Diameter signaling messages to and receives Diameter signaling messages from a Diameter network. Message processors 101A-D may be connected through an internal network 162. Although each message processor 101A-D may include all of the components of message processor 101 illustrated in FIG. 1A, for simplicity, only network management modules 137 and routing data 134 are illustrated in FIG. 1B. In operation, when a Diameter message arrives at one of message processors 101A-D, the message is routed based on Diameter signaling information and the message from the ingress message processor to the egress message processor, and from the egress message processor to the Diameter network. As will be described in detail below, each Diameter message processor 101A-D may perform the steps described herein for answer-based network management, which may be used to update routing or status information maintained by each message processor.

Figure 2:
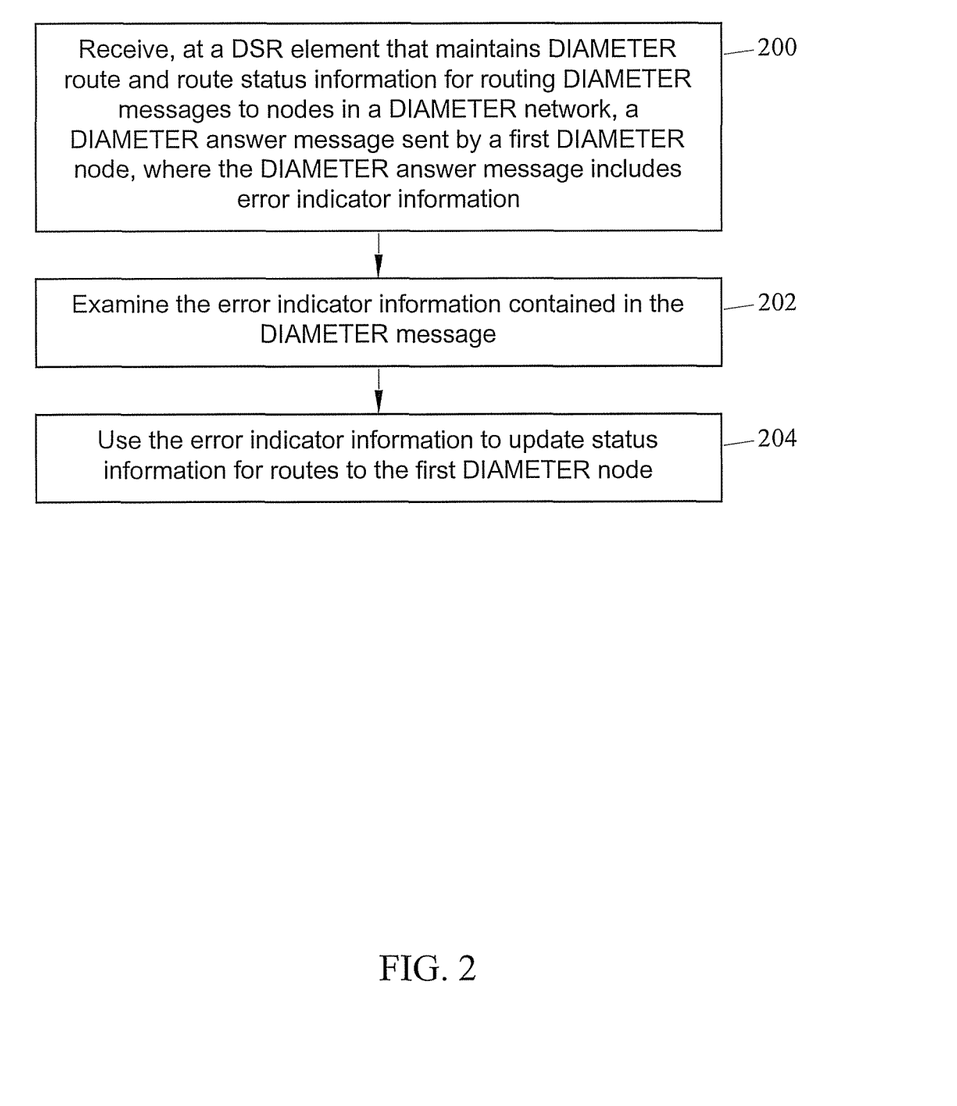
FIG. 2 is a flow chart illustrating exemplary steps for updating status information for routes based on error indicator information contained in a Diameter message as part of performing Diameter answer message-based network management at a DSR according to an embodiment of the subject matter described herein.

FIG. 2 is a flow chart illustrating exemplary steps for providing network management in a communications network that includes a Diameter relay/signaling routing node according to an embodiment of the subject matter described herein. Referring to FIG. 2, in step 200, a Diameter answer message sent by a first Diameter node may be received at a DSR element that maintains Diameter route and route status information for routing Diameter messages to nodes in a Diameter network, where the Diameter answer message includes error indicator information.

In step 202, the error indicator information contained in the Diameter message may be examined. For example, the error indicator information may include error Diameter_Too_Busy or any other error indicators specified in the Diameter base protocol.

In step 204, the error indicator information may be used to update status information for routes to the first Diameter node. For example, network management module 137 may update routing data 134 based on status information from a received answer message.

Figure 3:
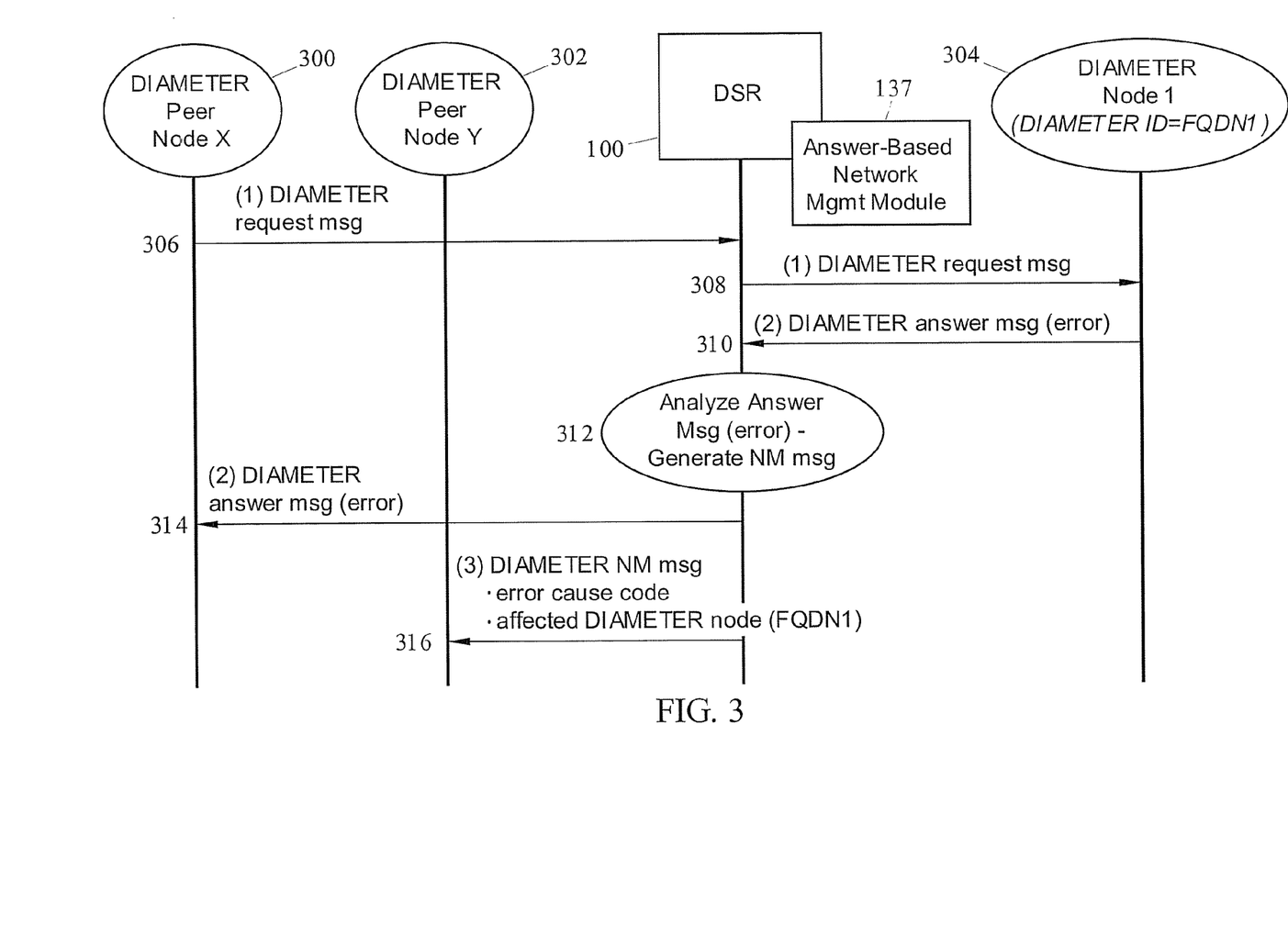
FIG. 3 is a message sequence diagram illustrating an exemplary broadcast scenario as part of performing Diameter answer message-based network management at a DSR according to an embodiment of the subject matter described herein.

FIG. 3 is a message flow diagram illustrating an exemplary message sequence for providing network management in a communications network that includes a Diameter routing agent/translation agent/proxy agent/relay agent/redirect agent/signaling routing node according to an embodiment of the subject matter described herein. Referring to FIG. 3, DSR 100 and associated answer-based network management module 137 may communicate with Diameter peer node 300. Diameter peer node 302 and Diameter node 304. For example, Diameter peer node 300 may send Diameter request message 306 to DSR 100. DSR 100 may forward Diameter request message 308 to Diameter node 304. In response, Diameter node 304 may return Diameter response message 310 that includes error indicator information to DSR 100. At step 312, DSR 100 may analyze Diameter answer message 310 and its error indicator information and generate a network management message. DSR 100 may then send Diameter answer message 314 including the error indicator information to Diameter peer node 300 and Diameter network management message 316 to Diameter peer 302. Diameter network management message 316 may, for example, include an error cause code and the identity of the affected Diameter node (e.g., the fully qualified domain name for Diameter node 304).

Figure 4:
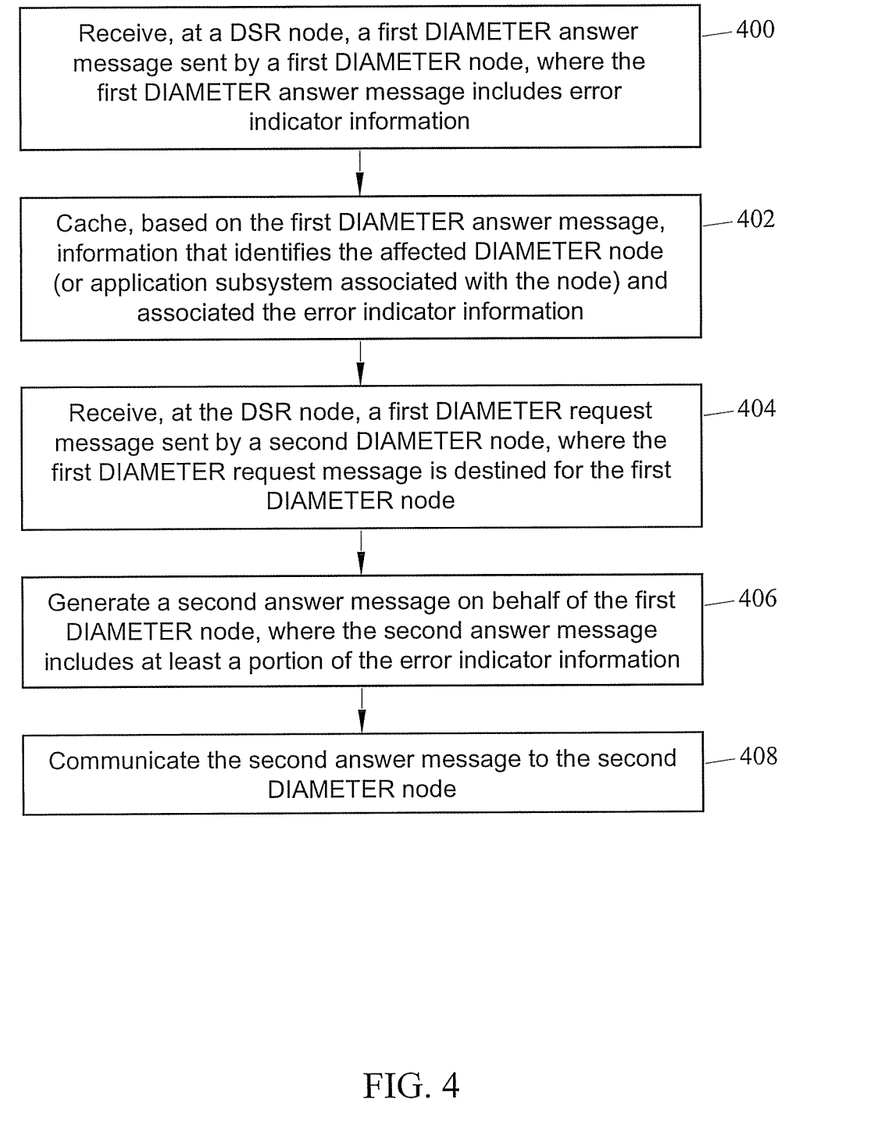
FIG. 4 is a flow chart illustrating exemplary steps for caching Diameter information and responding on behalf of another Diameter node as part of performing Diameter answer message-based network management at a DSR according to an embodiment of the subject matter described herein.

FIG. 4 is a flow chart illustrating exemplary steps for providing answer-based network management according to an embodiment of the subject matter described herein. Referring to FIG. 4, in step 400, a first Diameter answer message sent by a first Diameter node is received at a DSR node, where the first Diameter answer message includes error indicator information. For example, DSR 100 may receive an answer message from a Diameter server node.

In step 402, information that identifies the affected Diameter node (or an application subsystem associated with the affected Diameter node) and associated error indicator information is cached based on the first Diameter answer message. For example, DSR 100 may cache information from the answer message that identifies an affected subsystem of the Diameter server.

In step 404, a first Diameter request message sent by a second Diameter node is received at the DSR node, where the first Diameter request message is destined for the first Diameter node. For example, a Diameter client may send a request message to DSR 100, where the request is destined for the Diameter server.

In step 406, a second Diameter answer message is generated on behalf of the first Diameter node, where the second Diameter answer message includes information that is based on at least a portion of the error indicator information. For example, DSR 100 may use the cached information to generate an answer message on behalf of the server.

In step 408, the second Diameter answer message is communicated to the second Diameter node. For example, DSR 100 may send the generated answer to the client that originated the request.

Figure 5:
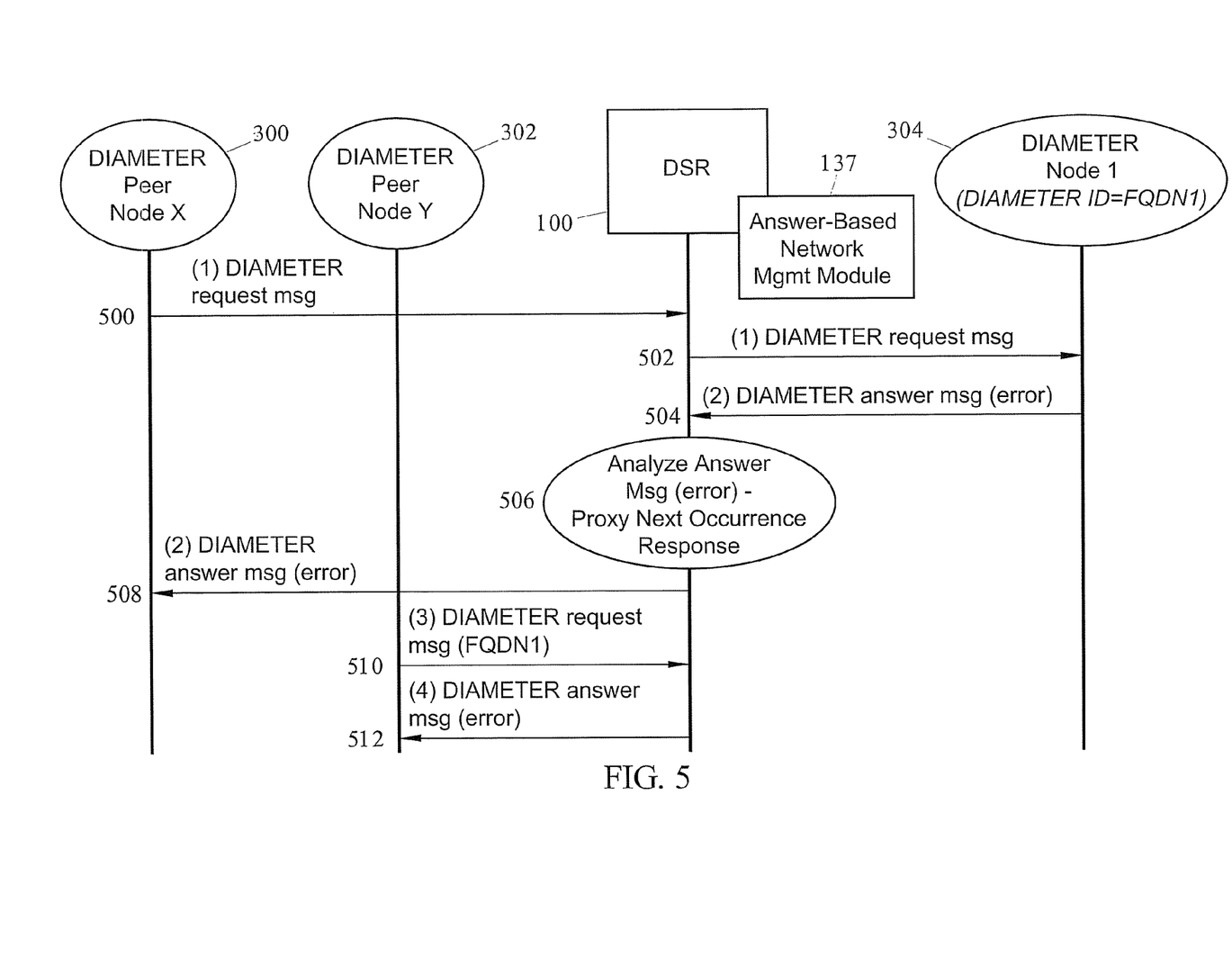
FIG. 5 is a message sequence diagram illustrating an exemplary conditional-on-Response "error" condition proxy scenario as part of performing Diameter answer message-based network management at a DSR according to an embodiment of the subject matter described herein.

FIG. 5 is a message sequence diagram illustrating an exemplary message sequence for providing network management in a communications network that includes a Diameter relay/signaling routing node according to an embodiment of the subject matter described herein. Referring to FIG. 5, Diameter peer node 300 may send Diameter request message 500 to DSR 100. DSR 100 may forward Diameter request message 502 to Diameter node 304. In response, Diameter node 304 may return Diameter answer message 504 that includes error indicator information to DSR 100. At step 506, DSR 100 may analyze Diameter answer message 504 and its error indicator information. DSR 100 may then send Diameter answer message 508 including the error indicator information or information that is based at least in part on the error indicator information to Diameter peer node 300. DSR 100 may also send Diameter request message 510 and Diameter answer message 512 including the error information or information that is based at least in part on the error indicator information to Diameter peer node 302.

Figure 6:
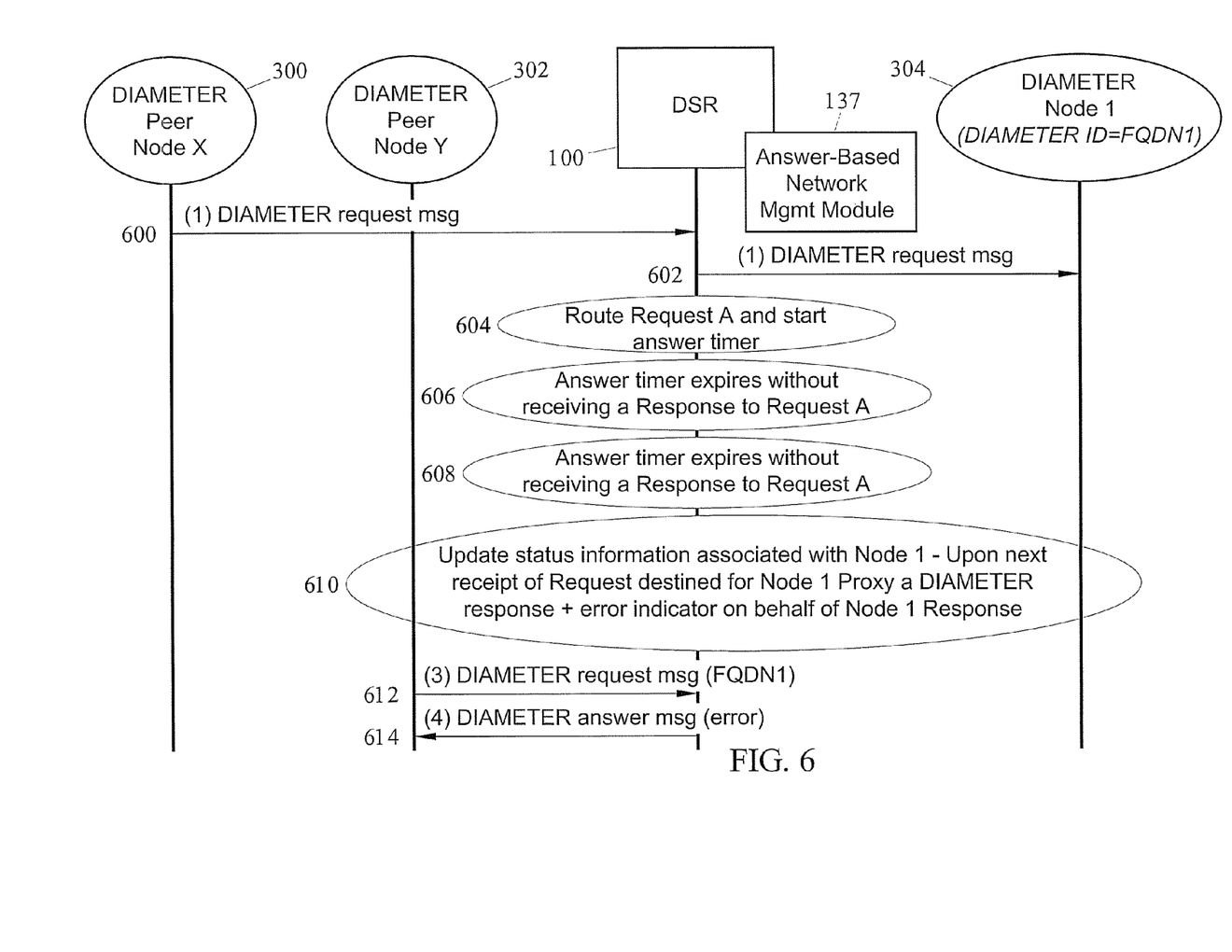
FIG. 6 is a message sequence diagram illustrating an exemplary conditional-on-absence of Response condition proxy scenario as part of performing Diameter answer message-based network management at a DSR according to an embodiment of the subject matter described herein.

FIG. 6 is a message sequence diagram illustrating an exemplary message sequence for providing network management in a communications network that includes a Diameter relay/signaling routing node according to an embodiment of the subject matter described herein. Referring to FIG. 6, Diameter peer node 300 may send Diameter request message 600 to DSR 100. DSR 100 may route Diameter request message 602 to Diameter node 304. At step 604, DSR 100 may start a timer for awaiting an answer to Diameter request message 602. At step 606, the response timer may expire without receiving a Diameter response message to Diameter request message 602. At step 608, status information associated with Diameter node 304 may be updated. Additionally, at step 608, upon receipt of a next Diameter request message destined for Diameter node 304, DSR 100 may proxy a Diameter response message including error indicator information on behalf of Diameter node 304. DSR 100 may then send Diameter request message 610 and Diameter response message including the error indicator information to Diameter peer node 302.

In an alternate embodiment, DSR 100 may start a timer when a Diameter request message is routed to or towards a destination and subsequently detect the expiration of this timer. If a Diameter answer message, related to the previously routed Diameter request message, is not detected prior to the expiration of the timer, then DSR 100 may be adapted to update internal route or destination status information associated with the Diameter request message. DSR 100 may further communicate associated Diameter network management/status information associated with the route or destination of the Diameter request message to one or more Diameter nodes in the network. For example, DSR 100 may communicate a network management message to a Diameter node in the network, where the network management message includes information which indicates that the route or destination associated with the Diameter request message is experiencing problems (e.g., congested, unavailable, unreachable, is not responding, etc.). Such unsolicited network management notifications may be made to other Diameter nodes (e.g., Diameter routing agents, Diameter application servers, etc.) that have been either statically or dynamically provisioned. A statically provisioned list/table/database of subscribing and subscribed-to Diameter nodes may be pre-provisioned at DSR 100. A dynamically provisioned list/table/database of subscribing and subscribed-to Diameter nodes may be constructed in real-time at DSR 100 as each "interested" Diameter node signals the router with information identifying those Diameter nodes to which it would like to subscribe to network management information updates. Such network management subscription information may be maintained, for example, at DSR 100 by a process or module associated with DRL 124 or DAL 102.

Answer-Based Internal Status Sharing

Figure 7A:
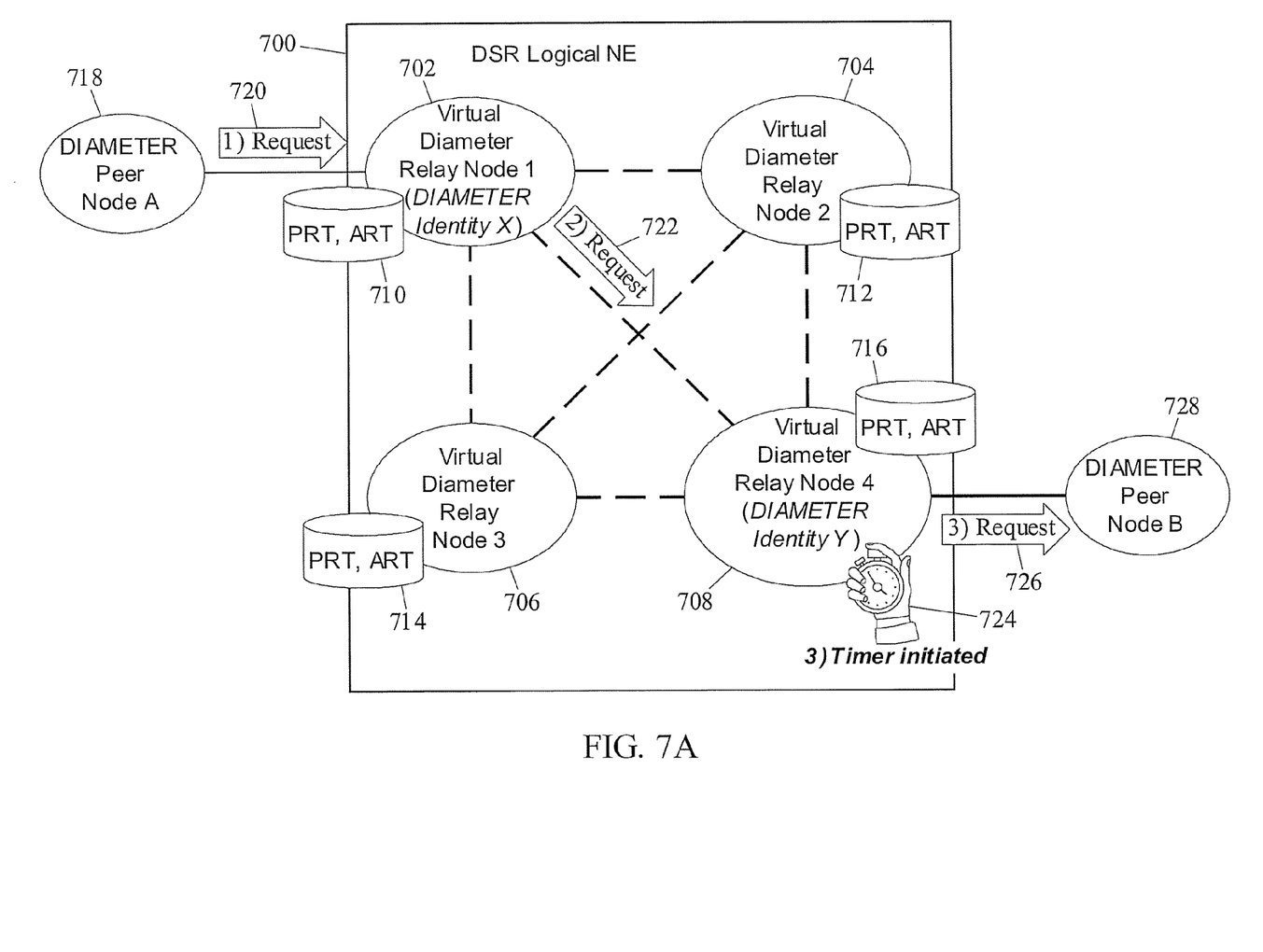
FIGS. 7A and 7B are diagrams illustrating an exemplary answer-based internal status sharing scenario as part of performing Diameter answer message-based network management at a DSR according to an embodiment of the subject matter described herein.

FIGS. 7A and 7B are diagrams illustrating an exemplary answer-based internal status sharing scenario as part of performing Diameter answer message-based network management at a DSR according to an embodiment of the subject matter described herein. Referring to FIG. 7A, DSR logical network element 700 may include multiple virtual Diameter relay nodes 702, 704, 706, and 708. Each virtual Diameter relay node 702-708 may be associated with a peer routing table (PRT) and application routing table (ART) 710, 712, 714, and 716, respectively. DSR logical network element 700 may be a DSR, such as DSR 100, where each MP functions as a virtual Diameter relay node. As such, network management information learned by one virtual relay node based on a received answer message may be directed to other relay nodes within NE 700.

ARTs 710-716 may each contain a prioritized list of user-configurable routing rules which define which local applications to invoke, and in which order, based upon message content.

PRTs 710-716 may each contain a prioritized list of user-configurable routing rules which define where to route a message to a peer based upon message content.

Diameter peer node 718 may send Diameter request message 720 to virtual Diameter relay node 702. Virtual Diameter relay node 702 may then direct Diameter request message 722 to egress virtual Diameter relay node 708. Virtual Diameter relay node 708 may then start a response/answer timer and route Diameter request message 726 to Diameter peer node 728.

Figure 7B:
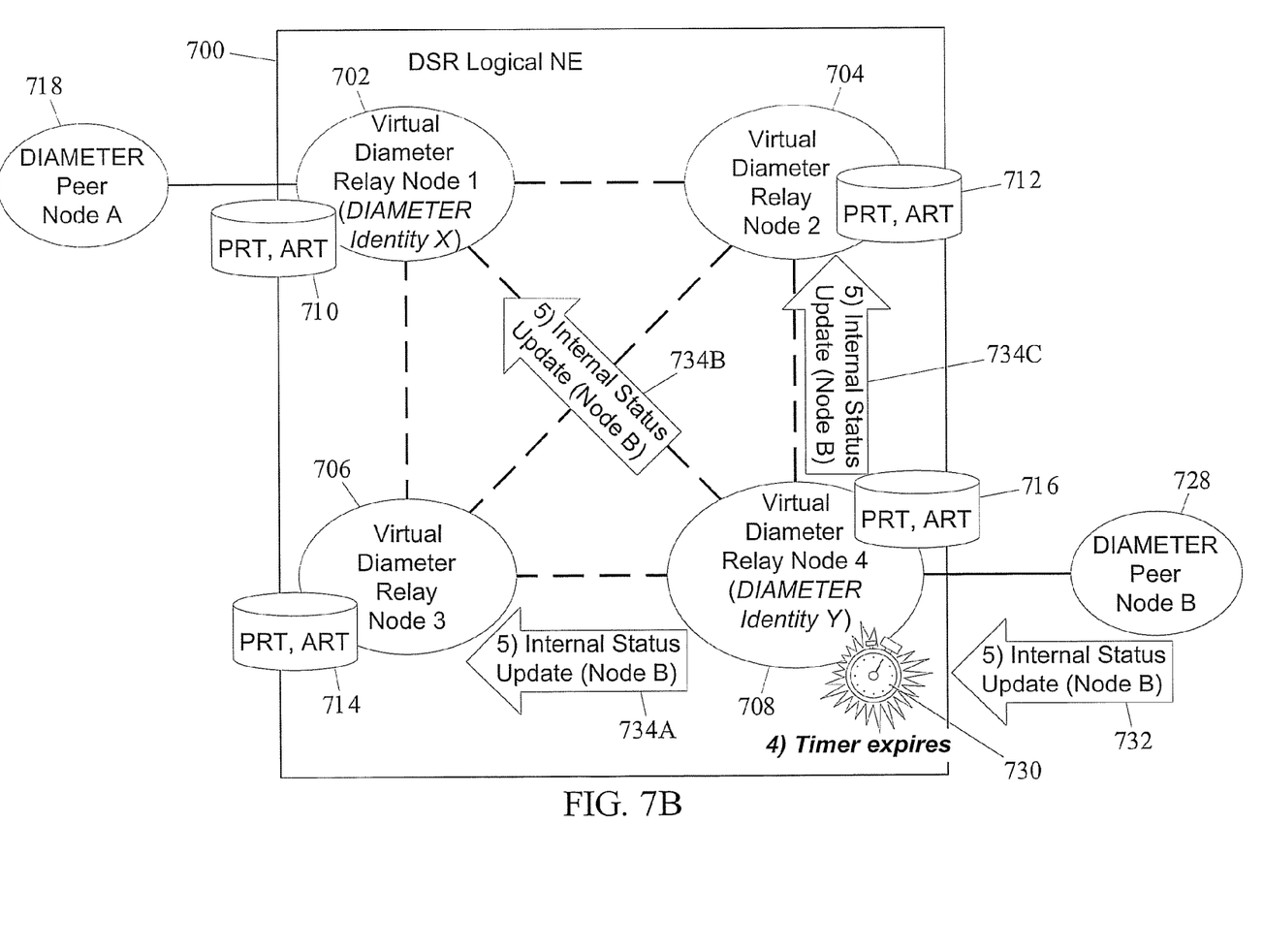

Referring to FIG. 7B, at step 730, the response/answer timer may expire before virtual Diameter relay node 708 receives Diameter response message 732 associated with Diameter request message 726. It is appreciated that Diameter response message 732 may include internal status update information for Diameter peer node 728.

Virtual Diameter relay node 708 may then communicate status update information to some or all virtual Diameter relay nodes in the DSR. For example, virtual Diameter relay node 708 may communicate status updates 734A, 734B, and 734C to virtual Diameter relay nodes 706, 702, and 704, respectively. In response, virtual Diameter relay nodes 706, 702, and 704 may update their respective ARTs and PRTs 714, 710, and 712, respectively, with the status information provided in status updates 734A, 734B, and 734C.

Lost Answer Responses

When answer messages are lost prior to their receipt by DSR 100, the "pending transactions" associated with the lost answer messages should either be aborted (answer response sent to peer) or re-routed. Since DSR 100 cannot directly "detect" a lost answer message, nor can it query the remote status of a forwarded Request message, it may predict with high probability that one has been lost.

One such prediction method may be time-based. If an answer has not been received in "X" seconds, then the answer message may be assumed to most likely be lost. The larger the value of "X", the higher the probability of loss. In one embodiment, a DRL "Lost answer Timer" may be supported and operator-configurable. An exemplary default value for X may be 30 seconds. It may be appreciated that the value of X may also be application dependent. For example, if the "Lost answer Timer" is application specific and DSR 100 supports multiple applications, the value may be per-application specific. It may also be appreciated that when the "Lost answer Timer" expires, DRL 124 may abort the transaction (default) and send an answer Response message. In another embodiment, DRL 124 may re-route the transaction.

Processing Answer Responses from Redirect Agents

It may be appreciated that the process for redirecting a response message may be a DRL-configurable option.

According to one embodiment, the response message may be propagated backwards. This may be a default option.

According to another embodiment, the response message may be re-routed using Redirect-Host AVPs.

Routing Answer Responses to Unavailable/Congested Peers

When DRL 124 receives an answer message and the message cannot be immediately delivered because the transport layer queue for the peer is full or the peer is congested, then DRL 124 has two options: delay delivery of the message within DRL 124 or immediately discard the answer message.

Delaying delivery of the message within DRL 124 may include buffering answer messages for a configurable time-period X1. If the peer's status changes before the timer expires, then the buffered answer messages may be forwarded. If the timer expires and the peer is Available, then an attempt may be made to forward the buffered answer message until the buffer is flushed or another blocking condition occurs (e.g., transport queue full). In order to prevent an answer message from being queued indefinitely, a "maximum answer message queue delay" may be supported (i.e.,
message aging) where the answer message may be discarded when the above mentioned maximum delay is exceeded. It may be appreciated that if the transport connection is blocked for an inordinate period of time, preventing any answer messages from being sent, the transport layer may be disconnected in order to clear the condition and trigger the peer to re-forward the messages in the pending transaction queue(s).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing answer message-based network management, the method comprising:

receiving, at a Diameter signaling router (DSR), a first Diameter answer message from a first Diameter node, wherein the first Diameter answer message includes error indicator information, wherein the first Diameter answer message is transmitted by the first Diameter node in response to a request transmitted to the first Diameter node and wherein the error indicator information concerns status of the first Diameter node;

examining, at the DSR, the error indicator information included in the first Diameter answer message; and using the error indicator information to update status information for routes maintained by the DSR to the first Diameter node.

2. The method of claim 1 comprising generating, by the DSR, a network management message based on the error indicator information received from the first Diameter node and communicating the network management message to other Diameter nodes.

3. The method of claim 1 wherein using the error indication information to update the status information includes updating status information maintained by each of a plurality of message processors of the DSR.

4. A method for providing answer message-based network management, the method comprising:

receiving, at a Diameter signaling router (DSR), a first Diameter answer message from a first Diameter node, wherein the first Diameter answer message includes error indicator information;

examining, at the DSR, the error indicator information included in the first Diameter answer message; and using the error indicator information to update status information for routes maintained by the DSR to the first Diameter node, wherein the error indicator information indicates that the first answer message cannot be immediately delivered to a peer because a transport layer queue for the peer is full or congested.

5. The method of claim 4 comprising buffering the first answer message for a configurable time period X1.

6. The method of claim 5 comprising forwarding the buffered answer message to the peer if the peer's status changes before the configurable time period X1 expires.

7. The method of claim 5 comprising attempting to forward the buffered answer message, if the configurable time period X1 expires and the peer's status is available, until the buffer is flushed or another blocking condition occurs.

8. The method of claim 5 comprising discarding the first answer message once the time period X1 expires.

9. A method for providing answer message-based network management, the method comprising:
- receiving, at a Diameter signaling router (DSR), a first Diameter answer message from a first Diameter node, wherein the first Diameter answer message includes error indicator information;
- examining, at the DSR, the error indicator information included in the first Diameter answer message;
- using the error indicator information to update status information for routes maintained by the DSR to the first Diameter node;
- receiving, the DSR, a first Diameter request message sent by a second Diameter node, wherein the first Diameter request message is destined for the first Diameter node;
- in response to receiving the first Diameter request message, generating a second Diameter answer message on behalf of the first Diameter node, wherein the second Diameter answer message includes information based on at least a portion of the error indicator information included in the first Diameter answer message; and
- communicating the second answer message to the second Diameter node.

10. The method of claim 9 wherein the error indicator information identifies an affected application subsystem associated with a Diameter node.

11. A system for providing answer message-based network management, the system comprising:
- a Diameter signaling router including:
  - a Diameter message processor associated for receiving a first Diameter answer message from a first Diameter node, wherein the first Diameter answer message includes error indicator information, wherein the first Diameter answer message is transmitted by the first Diameter node in response to a request transmitted to the first Diameter node and wherein the error indicator information concerns status of the first Diameter node; and
  - a network management (NM) module for examining the error indicator information contained in the first Diameter answer message and using the error indicator information to update status information for routes maintained by the DSR to the first Diameter node.

12. The system of claim 11 wherein the Diameter message processor is configured to generate a network management message based on the error indicator information received from the first Diameter node and to communicate the network management message to other nodes in the Diameter network.

13. The system of claim 11 wherein using the error indication information to update the status information includes updating status information maintained by each of a plurality of message processors of the DSR.

14. A system for providing answer message-based network management, the system comprising:
- a Diameter signaling router including:
  - a Diameter message processor associated for receiving a first Diameter answer message from a first Diameter node, wherein the first Diameter answer message includes error indicator information; and
  - a network management (NM) module for examining the error indicator information contained in the first Diameter answer message and using the error indicator information to update status information for routes maintained by the DSR to the first Diameter node, wherein the error indicator information indicates that the first answer message cannot be immediately delivered to a peer because a transport layer queue for the peer is full or congested.

15. The system of claim 14 wherein the network management module is configured to buffer the first answer message for a configurable time period X1.

16. The system of claim 15 wherein the network management module is configured to forward the buffered answer message to the peer if the peer's status changes before the configurable time period X1 expires.

17. The system of claim 15 wherein the network management module is configured to attempt to forward the buffered answer message, if the configurable time period X1 expires and the peer's status is available, until the buffer is flushed or another blocking condition occurs.

18. The system of claim 14 wherein the network management module is configured to establish a maximum answer message queue delay time period after expiration of which the answer message will be discarded.

19. A system for providing answer message-based network management, the system comprising:
- a Diameter signaling router including:
  - a Diameter message processor associated for receiving a first Diameter answer message from a first Diameter node, wherein the first Diameter answer message includes error indicator information; and
  - a network management (NM) module for examining the error indicator information contained in the first Diameter answer message and using the error indicator information to update status information for routes maintained by the DSR to the first Diameter node, wherein the network management module is configured for:
    - generating a second answer message on behalf of the first Diameter node in response to receiving the first Diameter request message, wherein the second answer message includes information based on at least a portion of the error indicator information included in the first Diameter answer message; and
    - communicating the second Diameter answer message to the second Diameter node.

20. The system of claim 19 wherein the caching module is configured to identify an affected application subsystem associated with a Diameter node.

21. A non-transitory computer readable medium comprising computer executable instructions embodied in a non-transitory computer readable medium and when executed by a processor of a computer performs steps comprising:
- at a Diameter signaling router (DSR):
  - receiving, a Diameter answer message from a first Diameter node, wherein the Diameter answer message includes error indicator information, wherein the first Diameter answer message is transmitted by the first Diameter node in response to a request transmitted to the first Diameter node and wherein the error indicator information concerns status of the first Diameter node;
  - examining the error indicator information included in the Diameter message; and
  - using the error indicator information to update status information for routes to the first Diameter node.

* * * * *